United States Patent

[11] 3,599,664

[72] Inventors Kenneth W. Hotchkiss
 Golden;
 John F. Schrunk, Arvada, Colo.; Le Roy Thom, Hastings, Nebr.
[21] Appl. No. 850,425
[22] Filed Aug. 15, 1969
[45] Patented Aug. 17, 1971
[73] Assignee T-L Irrigation Company
 Hastings, Nebr.

[54] SELF-PROPELLED IRRIGATING APPARATUS
 10 Claims, 7 Drawing Figs.
[52] U.S. Cl. .................................................. 137/344,
 180/9.64
[51] Int. Cl. ...................................................... A01g 25/02,
 F16n 13/22
[50] Field of Search ....................................... 180/9.64;
 239/212, 43; 137/344

[56] References Cited
 UNITED STATES PATENTS
| 1,518,465 | 12/1924 | Sternberg | 180/9.64 X |
| 2,893,643 | 7/1959 | Gordon | 239/177 X |
| 3,009,646 | 11/1961 | Purtell | 239/212 X |
| 3,023,824 | 3/1962 | Bombardier | 180/9.64 |
| 3,386,661 | 6/1968 | Olson et al. | 137/344 X |
| 3,394,729 | 7/1968 | Bower et al. | 137/344 |

Primary Examiner—Henry T. Klinksiek
Attorney—Bertha L. MacGregor

ABSTRACT: Self-propelled irrigating apparatus comprising a water distributing pipe made of relatively rigid sections and flexible joints between and connected to the sections, spaced apart supports supporting the distributing pipe, drive means for moving the supports in annular paths around a center, a hydraulic motor on each support, and hydraulic conduits extending along the outside of the distributing pipe for controlling the motors including a hydraulic valve and pressurized hydraulic fluid and return lines to and from each motor through said valve. The system is controlled entirely by the hydraulic means and mechanism responsive to bending of the flexible joints, without any electrical wiring or switches. Each flexible joint is mounted on a pivotal platform on a support; the platform responds to bending of the flexible joint and actuates the spool of the hydraulic valve to control flow of hydraulic fluid to the motor.

INVENTORS
KENNETH W. HOTCHKISS
JOHN F. SCHRUNK
LeRoy THOM
BY Bertha L. MacGregor
ATTORNEY

PATENTED AUG 17 1971
3,599,664

INVENTORS
KENNENTH W. HOTCHKISS
JOHN F. SCHRUNK
LeRoy THOM
BY
Bertha L. MacGregor
ATTORNEY

PATENTED AUG 17 1971 3,599,664

INVENTORS
KENNENTH W. HOTCHKISS
JOHN F. SCHRUNK
LeRoy THOM
BY
Bertha L. MacGregor
ATTORNEY

SELF-PROPELLED IRRIGATING APPARATUS

This invention relates to a self-propelled irrigation apparatus and more particularly to a center pivot, wheel or track mounted self-propelled irrigating apparatus, designed for irrigating by sprinkling large areas such as a quarter section of land.

The essential elements of such apparatus include a center pivot structure which is the axis of the apparatus, a distributing pipe provided with spaced-apart nozzles, supports or towers for carrying the distributing pipe, motor driven means for driving the supports in annular paths around the pivot structure, and control mechanism for the motor driven means.

A conventional installation may employ a distributing pipe approximately 1,250—1,300 ft. long and having a diameter of 4 to 12 inches depending on the water supply. Such a distributing pipe is mounted at one end in the center pivot structure and supported throughout its length on supports spaced 90 to 100 feet apart. The supports are provided with means for traveling in annular paths around the pivot structure, said paths being of different lengths increasing from the innermost to the outermost path. The means for driving the outermost support sets the pace for the power units associated with the other supports and therefore may be termed the master power unit.

In the event the supports encounter uneven terrain which may affect their travel speed, or if any support lags behind or moves ahead of the radial line between the center pivot structure and the master unit, for any reason, the distributing pipe may be subjected to stress exerted in vertical, horizontal or intermediate directions, causing bending of the pipe and, unless quickly corrected, serious injury to the apparatus. If the distributing pipe is made up of rigidly constructed and rigidly connected sections of pipe, such stress may result in breakage of the pipe and other damage to the apparatus.

One object of this invention is to provide flexible joints between relatively rigid sections of distributing pipe.

Another object is to provide means for automatically halting or speeding the operation of the motor-driven means for one or more supports in response to a signal conveyed by the flexing of the joint between adjacent sections of pipe, and for automatically restoring the operation when the joint and pipe sections have resumed normal predetermined positions.

An important feature of the invention is the maintenance of alignment of the distributing pipe and avoidance of conditions which may produce injury to the pipe or other parts of the apparatus, without the use of electrical wiring or switches of any kind.

Another object of the invention is to provide means for moving the supports, which may be wheels or track mounted wheels, said tracks being made of shock resistant material such as polyurethane, rubber or other suitable flexible material, which does not transmit shocks to the apparatus as do steel tracks, which reduces weight as compared with conventional track means, and provides high flotation to avoid formation of and sinking into deep ruts. The light weight of the track resulting from the use of material such as polyurethane, for example, permits the use of lighter drive mechanism which minimizes friction.

In the drawings:

FIG. 3 is an elevational side view of one of the pipe supporting towers.

FIG. 4 is an end view of the tower of FIG. 3, showing parts of two sections of the distributing pipe, broken away.

Figure 1:
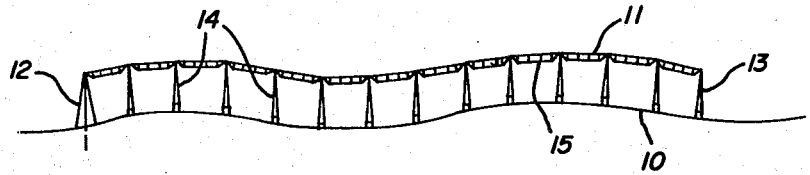
FIG. 1 is an elevational side view of apparatus embodying my invention, showing a center pivot structure and a master support unit at opposite ends of the distributing pipe supported by intermediate supports.
Figure 2:
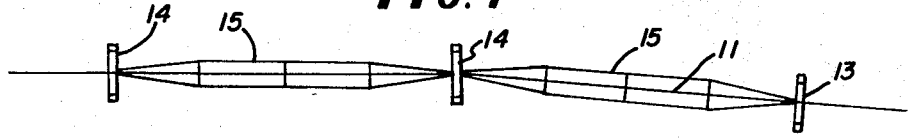
FIG. 2 is a plan view of two distributing pipe sections and three supports, on an enlarged scale.

In the embodiment of the invention shown in the drawings, 10 indicates the surface of the land over which the apparatus may travel. The distributing pipe 11 is mounted at one end in the center pivot structure 12 and its opposite end is supported on the master support unit 13. Intermediate supports are designated 14. The distributing pipe 11 is further supported between supports by trusses 15.

Referring to FIGS. 3 and 4, the support 14 comprises a triangularly shaped frame consisting of a pair of relatively wide channel bars 16, 17, upwardly inclined toward each other and connected near their upper ends by crosspieces 18, 19, and at their lower ends by a horizontal platform 20. The frame is braced by a horizontal channel brace 21, and vertical braces 21'. A longitudinally extending platform, parallel to the distributing pipe 11, extends beneath the pipe. The platform consists of a fixed left-hand member 23 and a pivotally mounted right-hand member 23'. The pivotal mounting is a ball joint 24, connected to the side bar 16 of the frame of the support 14, as shown in FIG. 4. The joints formed by the frame bars 16 and 17 and platform 20 are reinforced by fitting plates 25.

The frame of each support is provided with propelling means consisting of two sets of track mounted wheels, one set being located at one side of the support and distributing pipe and the other set being located at the opposite side. The track mounted wheels comprise pairs of side plates 26, 27, bolted to the fitting plates 25, and between the side plates of each pair is mounted a track 30 made of polyurethane trained over idler wheels 31 on shafts 32 and over a shaft 36 which has sprockets (not shown) mounted thereon. The shafts 32 are mounted in pillow blocks 33 rigidly fastened to the wheel bars 34 connected to the side plates 26, 27. Each wheel bar 34 has an upwardly inclined end portion 35 which supports the shaft 36.

A sprocket wheel 37 is mounted on the outer end of the shaft 36, outwardly of the wheel bar 34. The sprocket wheel 37 and shaft 36 are driven by an hydraulic motor 38 through a sprocket chain 39. The motor is a variable speed reversible motor. A mounting plate for sprocket and chain speed reduction is designated 38'. The motor 38 is mounted on the platform 20 and is connected by conduits 42, 43, to a control valve 50 hereinafter described. Hydraulic fluid is supplied to the control valve 50 by pressure and return lines 40, 41. The conduits 40, 41 communicate with an hydraulic supply (not shown) which may be located at or near the center pivot.

Figure 5:
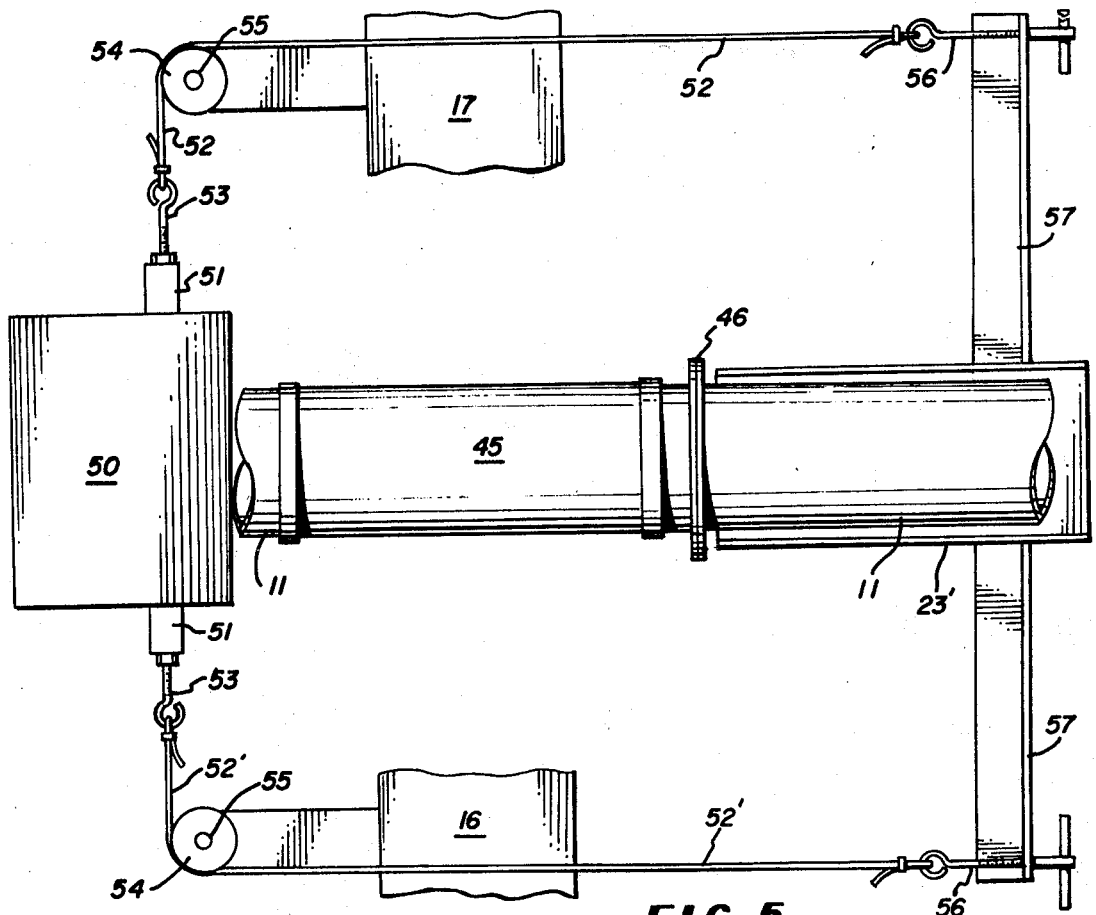
FIG. 5 is a plan view, on an enlarged scale, of a part of the distributing pipe and a flexible joint, and of a control valve and control mechanism for actuating the valve.
Figure 6:
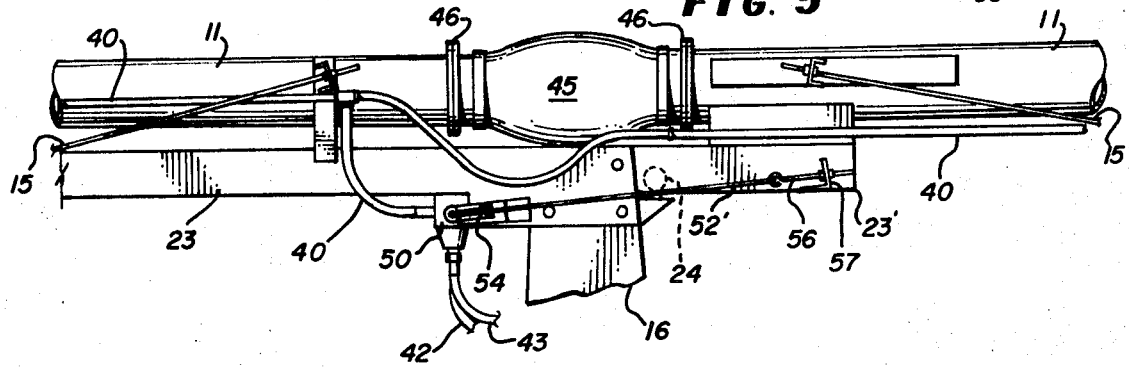
FIG. 6 is an elevational side view of the parts shown in FIG. 5.

Referring to FIGS. 4, 5 and 6, the distributing pipe 11 is provided between its sections with flexible joints 45, each being a length of hose having approximately the same diameter as the pipe 11, made of rubber or other suitable flexible material, joined to the ends of a pair of pipe sections by bolts passing through flanges 46 on the joint and pipe sections. Each joint 45 is located between pipe sections on the pivotally mounted platform 23' above the supports 14 and therefore any stress exerted on a pipe section is transmitted to the adjacent attached flexible joint which actuates a control bar hereinafter described, located conveniently near to the support on which the control mechanism is mounted.

An hydraulic control valve 50, of the spool type, in which a spool 51 controls passage of hydraulic fluid to motor 38 through conduits 42, 43, is mounted on each support 14 slightly below and near one end of the flexible joint 45 so that the spool 51 is reciprocably movable in the valve 50 in directions transverse of the pipe 11. The opposite ends of the spool 51 have connected thereto cables 52 and 52' by adjustable hook connectors 53. The cables 52 and 52' are trained over sheaves 54 on shafts 55 mounted on any suitable support connected to the frame members 16, 17 of the support 14, and located so that the cables 52 and 52' extend in a direction transversely of the distributing pipe 11 between the spool 51 and sheaves 54, and then longitudinally of the pipe 11 at opposite sides thereof to adjustable connectors 56 which connect the cables to the control bar 57. The latter extends in transverse direction between the two cables and is connected to the pivoted platform 23' to which the flexible joint is fastened in such manner that when the flexible joint 45 bends in any direction, pivotal movement is transmitted to the platform 23', and thus to the control bar 57. When the flexible joint is flexed as aforesaid, the control bar 57 exerts pulling action on one of the cables which in turn pulls the spool 51 of valve 50 into such position that flow of hydraulic fluid from conduit 40 is decreased or interrupted and the hydraulic motor 38 is slowed or made inactive temporarily, until the flexing of the joint 45 ceases and the joint resumes normal position.

Figure 7:
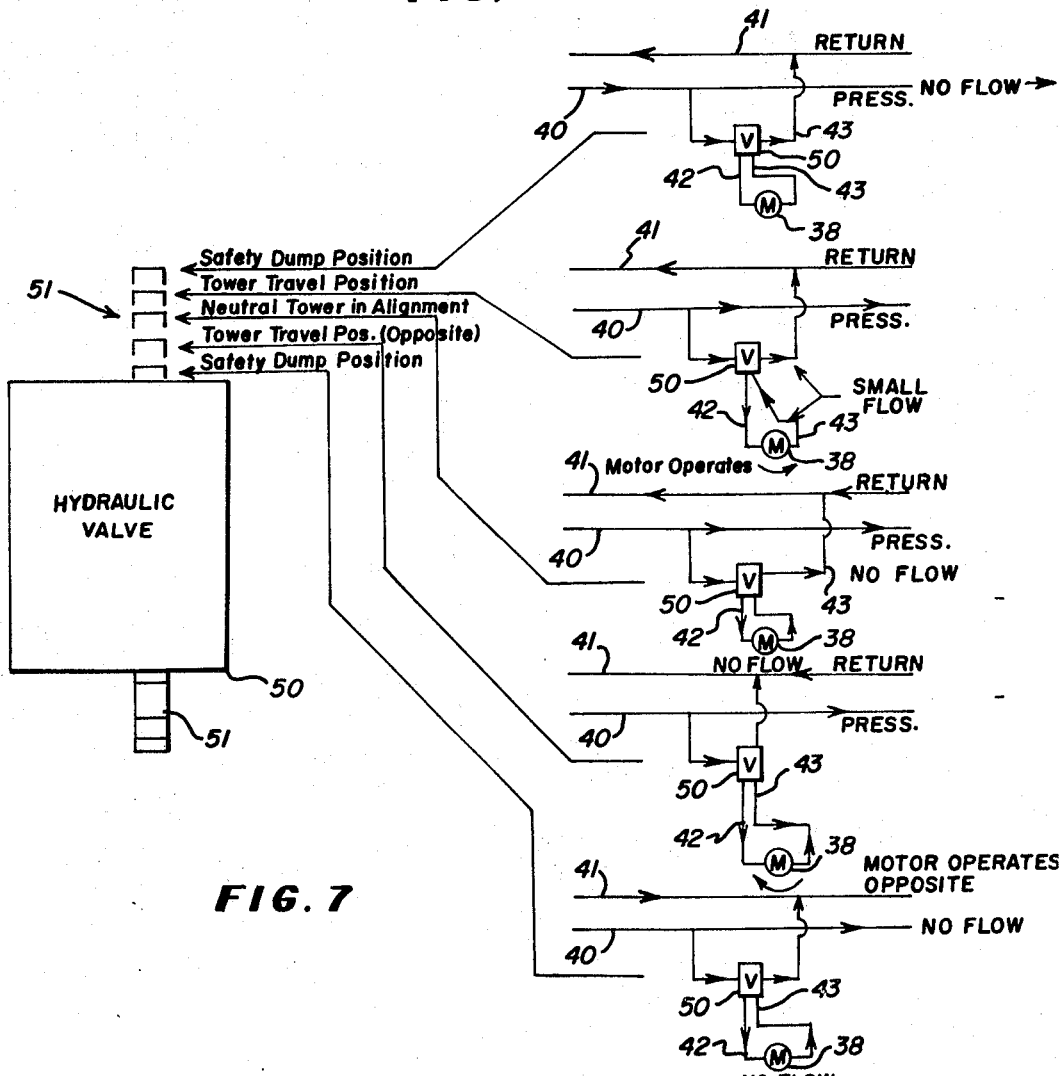
FIG. 7 is a diagrammatic view of the control valve and the hydraulic conduits controlled by the valve.

FIG. 7 shows diagrammatically the operation of the hydraulic control valve 50 and its effect on the motor 38. In the neutral position, when the spool 51 protrudes an equal distance at each end from the housing of the valve 50, and the control bar 57 is in the perpendicular position relatively to the pipe 11, as shown in FIG. 5, there is no flow from line 40 through valve 50, and no flow through lines 42 and 43 to and from the motor 38. Oil line 40 is placed under pressure by means (not shown) located at the center structure 12, which causes the master tower 13 to begin movement in its annular path, instantly placing either cable 52 or 52' under slight tension (depending on the direction of travel of the master tower) which causes pivotal movement of platforms 23' and control bars 57, and causes the spools 51 of valves 50 to be moved into the tower travel position permitting a small flow of oil through valves 50, through lines 42 to motors 38 and lines 43 to return line 41. In this position the motors 38 are operating and towers 14 travel at predetermined pace in their respectively annular paths unless interfered with by conditions of surface 10 or for other reasons.

Interference with the predetermined travel of the supports may affect one or more supports, and to a greater or lesser degree. The degree of flexing of a joint 45 determines the tension which is imposed on either cable 52 or 52'. The tension on one of the cables, with resultant actuation of spool 51 of valve 50, increases or decreases the amount of flow of hydraulic fluid through valve 50, line 42, to motor 38, causing the motor to increase or decrease its speed. Tension on the other cable may cause the motor to reverse the direction of the motor shaft and consequently the travel of the support drive means.

If a tower or support 14 should become stalled due to slippage or other factors so that maximum flexing of a joint 45 and maximum misalignment of pipe sections 11 occur, the maximum movement of spool 51 of valve 50 results, causing the entire oil flow to be "dumped," which means the oil is passed into the return line 41, thus lessening or eliminating the pressure in line 40, to ultimately incapacitate the entire system.

From the foregoing it will be understood that misalignment of pipe sections 11 is corrected automatically by increase or decrease in the volume of flow of hydraulic fluid to a motor or motors 38 if the misalignment is minor, but if the misalignment is such that maximum movement is imparted to the valve spool 51 through movement of control bar 57 and cables, 52 or 52', then some corrective means have to be employed to restore the system to normal operation. During the period of inoperativeness, after the oil has been "dumped," the pressure in line 40 is too small to propel any of the support units.

By reversing the direction of travel of the master support 13, the entire apparatus will automatically reverse its travel, due to reversal of flow of hydraulic fluid through motors 38.

The entire control of the operation of the apparatus, including neutral, operative, corrective and safety controls, is performed by the hydraulic fluid system and hydraulic valve, without the use of any electrical switches or wiring.

We claim:

1. In self-propelled irrigation apparatus which includes a center pivot structure, a master support driven at predetermined speed, a sectional water distributing pipe having an end supported by the center pivot structure and another end supported by the master support, and intermediate supports each pivotally supporting one of said pipe sections at one end of said section, the improvement which comprises
   a. drive means on each support for moving said support,
   b. a hydraulic motor on each intermediate support operatively connected to the drive means,
   c. a hydraulic control valve on each intermediate support, said valve having a spool reciprocably movable in the valve to extend beyond opposite ends of the valve in directions transversely of the distributing pipe,
   d. a pressurized hydraulic fluid line and a return line extending along the outside of the water distributing pipe to and from the hydraulic control valve on each intermediate support,
   e. a hydraulic fluid line between each control valve and motor and a hydraulic fluid return line between each motor and control valve, and
   f. control mechanism connected to the distributing pipe and to opposite ends of a hydraulic valve spool responsive to misalignment of the pipe sections for actuating the control valve and controlling flow of hydraulic fluid to its associated motor.

2. The improvement defined by claim 1, in which the spool is moved in the valve to extend beyond opposite ends of the valve to varying extents by the control mechanism to limit the amount of flow to the motor, permit free flow to the motor, or to dump the hydraulic fluid into the return hydraulic line, depending on the degree of misalignment of the distributing pipe sections.

3. The improvement defined by claim 1, in which the control mechanism includes cables extending longitudinally on opposite sides of and parallel to a distributing pipe section from the valve spool to the control mechanism.

4. The improvement defined by claim 3, in which the control mechanism includes a control bar actuated by bending of the distributing pipe, said bar being connected to the cables.

5. A self-propelled irrigation apparatus which includes a center pivot structure, a master support driven at predetermined speed, and intermediate supports, comprising
   a. a water distributing pipe comprising a plurality of relatively rigid pipe sections and flexible joints consisting of short lengths of rubber tubing flanged at their ends connected to said sections between their ends, said pipe being supported at one end by said center pivot structure, at the opposite end by said master support, and said pipe sections being pivotally supported at one end by said intermediate supports,
   b. each intermediate support including a fixed platform supporting part of a pipe section and a pivotally movable platform supporting a flexible joint,
   c. drive means on each support for moving said support,
   d. a hydraulic motor on each intermediate support operatively connected to the drive means,
   e. a hydraulic control valve on each intermediate support, said valve having a spool reciprocably movable in the valve to extend beyond opposite ends of the valve in directions transversely of the distributing pipe,
   f. means supplying pressurized hydraulic fluid through said control valve to the motor on a support, and
   g. control mechanism connected to the pivotally movable platform and to opposite ends of a hydraulic valve spool responsive to misalignment of the flexible joint for actuating the control valve and controlling flow of hydraulic fluid to its associated motor.

6. The improvement defined by claim 5, in which the spool is moved in the valve to extend beyond opposite ends of the valve to varying extents by the control mechanism to limit the amount of flow to the motor, permit free flow to the motor, or to dump the hydraulic fluid, depending on the degree of misalignment of the flexible joint.

7. The apparatus defined by claim 5, in which the control mechanism includes cables extending longitudinally on opposite sides of and parallel to the distributing pipe from the valve spool to the control mechanism.

8. The apparatus defined by claim 7, in which the control mechanism includes a control bar actuated by bending of the flexible joint, said bar being connected to the cables.

9. The apparatus defined by claim 5, in which the means supplying pressurized hydraulic fluid through the control valve to the motor on a support comprises a pressurized hydraulic fluid line and a return fluid line extending along the outside of the distributing pipe to and from each hydraulic control valve and a hydraulic fluid line between each control valve and motor and a hydraulic fluid return line between each motor and control valve.

10. A self-propelled irrigation apparatus which includes a center pivot structure, a master support driven at predetermined speed, and intermediate supports, comprising a. a water distributing pipe comprising a plurality of relatively rigid pipe sections and flexible joints connected to said sections between their ends, said pipe being supported at one end by said center pivot structure, at the opposite end by said master support, and at said ends by said intermediate supports,
  b. each intermediate support including a fixed platform supporting part of the pipe sections and a pivotally movable platform supporting the flexible joint,
  c. drive means on each support,
  d. a hydraulic motor on each intermediate support operatively connected to the drive means,
  e. a hydraulic control valve on each intermediate support comprising a spool movable in opposite directions transversely of the flexible joint,
  f. means supplying pressurized hydraulic fluid through said control valve to the motor on a support, and
  g. control mechanism connected to the pivotally movable platform and to a hydraulic valve responsive to misalignment of the flexible joint for actuating the control valve and controlling flow of hydraulic fluid to its associated motor, said control mechanism including cables extending longitudinally on opposite sides of the distributing pipe from the valve spool to the control mechanism, said control mechanism comprising a control bar connected to the cables, sheaves located on opposite ends of the valve spool, said cables extending from the spool ends to the sheaves in axial alignment with the spool and extending from the sheaves to the control bar in directions at right angles to the axis of the spool.